US008630784B2

(12) United States Patent
Bai

(10) Patent No.: US 8,630,784 B2
(45) Date of Patent: Jan. 14, 2014

(54) METHOD AND SYSTEM FOR DETECTING AND COMPENSATING WEATHER CONDITION EFFECTS ON WIRELESS SIGNALS

(75) Inventor: Sue Bai, Novi, MI (US)

(73) Assignee: Honda Motor Co., Ltd., Tokyo (JP)

(*) Notice: Subject to any disclaimer, the term of this patent is extended or adjusted under 35 U.S.C. 154(b) by 561 days.

(21) Appl. No.: 12/839,035

(22) Filed: Jul. 19, 2010

(65) Prior Publication Data
US 2012/0016553 A1    Jan. 19, 2012

(51) Int. Cl.
*G01C 21/26* (2006.01)
*G08G 1/0968* (2006.01)

(52) U.S. Cl.
USPC ................. 701/102; 702/3; 340/905

(58) Field of Classification Search
None
See application file for complete search history.

(56) References Cited

U.S. PATENT DOCUMENTS

| | | | |
|---|---|---|---|
| 5,966,229 A * | 10/1999 | Dodley et al. ................ | 398/120 |
| 6,499,359 B1 | 12/2002 | Washeleski et al. | |
| 6,782,759 B2 | 8/2004 | Shank et al. | |
| 6,862,502 B2 | 3/2005 | Peltz et al. | |
| 6,873,601 B1 * | 3/2005 | Chow et al. ................... | 370/254 |
| 6,919,803 B2 | 7/2005 | Breed | |
| 6,970,651 B1 | 11/2005 | Schuster et al. | |
| 7,015,824 B2 | 3/2006 | Cleveland et al. | |
| 7,132,642 B2 | 11/2006 | Shank et al. | |
| 7,162,928 B2 | 1/2007 | Shank et al. | |
| 7,181,146 B1 | 2/2007 | Yorks | |
| 7,293,467 B2 | 11/2007 | Shank et al. | |
| 7,330,784 B2 | 2/2008 | Johnson et al. | |
| 7,386,372 B2 | 6/2008 | Breed et al. | |
| 7,421,248 B1 * | 9/2008 | Laux et al. ................ | 455/67.11 |
| 7,513,166 B2 | 4/2009 | Shank et al. | |
| 7,523,803 B2 | 4/2009 | Breed | |
| 2003/0065432 A1 * | 4/2003 | Shuman et al. ................ | 701/48 |
| 2005/0143874 A1 | 6/2005 | Peltz et al. | |
| 2006/0048845 A1 | 3/2006 | Slavin et al. | |
| 2006/0132306 A1 | 6/2006 | Cleveland et al. | |
| 2006/0220842 A1 | 10/2006 | Breed | |
| 2006/0270442 A1 * | 11/2006 | Miller et al. ................ | 455/522 |
| 2008/0030370 A1 * | 2/2008 | Doyle ........................ | 340/905 |
| 2008/0157940 A1 | 7/2008 | Breed et al. | |
| 2009/0005990 A1 * | 1/2009 | Anderson et al. ................ | 702/2 |
| 2009/0016545 A1 | 1/2009 | Stelliga et al. | |
| 2009/0046538 A1 | 2/2009 | Breed et al. | |
| 2009/0158857 A1 | 6/2009 | Shank et al. | |
| 2009/0171549 A1 * | 7/2009 | Hyde et al. .................... | 701/102 |
| 2010/0004863 A1 * | 1/2010 | Ladow et al. .................... | 702/3 |
| 2010/0198459 A1 * | 8/2010 | Kosai et al. .................... | 701/36 |
| 2010/0267344 A1 * | 10/2010 | Guner et al. ................ | 455/67.11 |
| 2011/0009151 A1 * | 1/2011 | Miucic ........................ | 455/522 |
| 2012/0076007 A1 * | 3/2012 | Nelson ........................ | 370/252 |
| 2012/0127921 A1 * | 5/2012 | Laufer ........................ | 370/316 |

\* cited by examiner

*Primary Examiner* — James Trammell
*Assistant Examiner* — Demetra Smith-Stewart
(74) *Attorney, Agent, or Firm* — Plumsea Law Group, LLC

(57) ABSTRACT

A method and system for adjusting an operation of a wireless communication device based on information related to at least one of an operating status of a vehicle system and a weather condition. The method includes a step of receiving at least one information source related to an operation status of at least one vehicle system of a motor vehicle. The method further includes a step of analyzing the information to determine an ambient moisture condition. The method also includes adjusting an operating parameter of the wireless communication device and then operating the wireless communication device according to the adjusted operating parameter to compensate for attenuation to a wireless signal caused by the ambient moisture.

32 Claims, 7 Drawing Sheets

METHOD AND SYSTEM FOR DETECTING AND COMPENSATING WEATHER CONDITION EFFECTS ON WIRELESS SIGNALS

BACKGROUND

The present disclosure generally relates to wireless communication systems and wireless communication devices that communicate within wireless communication systems. In particular, the embodiments relate to methods and systems for improving the performance of wireless communication devices used in vehicle-to-vehicle and vehicle-to-infrastructure communications.

Wireless communication devices have been proposed for use in vehicle-to-vehicle and vehicle-to-infrastructure communications. In some situations, the wireless communication devices are exposed to weather conditions, such as humidity and precipitation, that interfere with the performance of the data transmission and reception.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

One embodiment provides a method for adjusting an operation of a wireless communication device that communicates with another wireless communication device. The method may include the steps of: receiving information from at least one information source related to an operation status of at least one vehicle system of a motor vehicle; analyzing the information to determine an ambient moisture condition; based on the analysis, adjusting an operating parameter of the wireless communication device; and operating the wireless communication device according to the adjusted operating parameter.

Another embodiment provides a wireless communication system that is configured to communicate over a vehicle communication network. The wireless communication device may include: a wireless communication device configured to communicate with another wireless communication device; an ambient moisture determiner that is configured to receive information related to an operating status of a system of a motor vehicle and a weather condition, and to determine an ambient moisture condition based on the received information; and a wireless communication controller that is configured to adjust an operating parameter of the wireless communication device based on a determination by the ambient moisture determiner.

Another communication device that is configured to communicate over a vehicle network communication. In one aspect, the method may include the following steps: receiving information from at least one information source related to at least one of an operating status of a vehicle system of a motor vehicle and a weather condition; analyzing the information to determine an ambient moisture condition; based on the determined ambient moisture condition, adjusting a transmitter parameter of the wireless communication device; and transmitting a wireless signal to another wireless communication device according to the adjusted parameter. In another aspect the method may include the following steps: receiving information from at least one information source related to at least one of an operating status of a vehicle system of a motor vehicle and a weather condition; analyzing the information to determine an ambient moisture condition; based on the determined ambient moisture condition, adjusting a receiver parameter of the wireless communication device; and receiving a wireless signal from another wireless communication device according to the adjusted parameter.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and descriptions. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
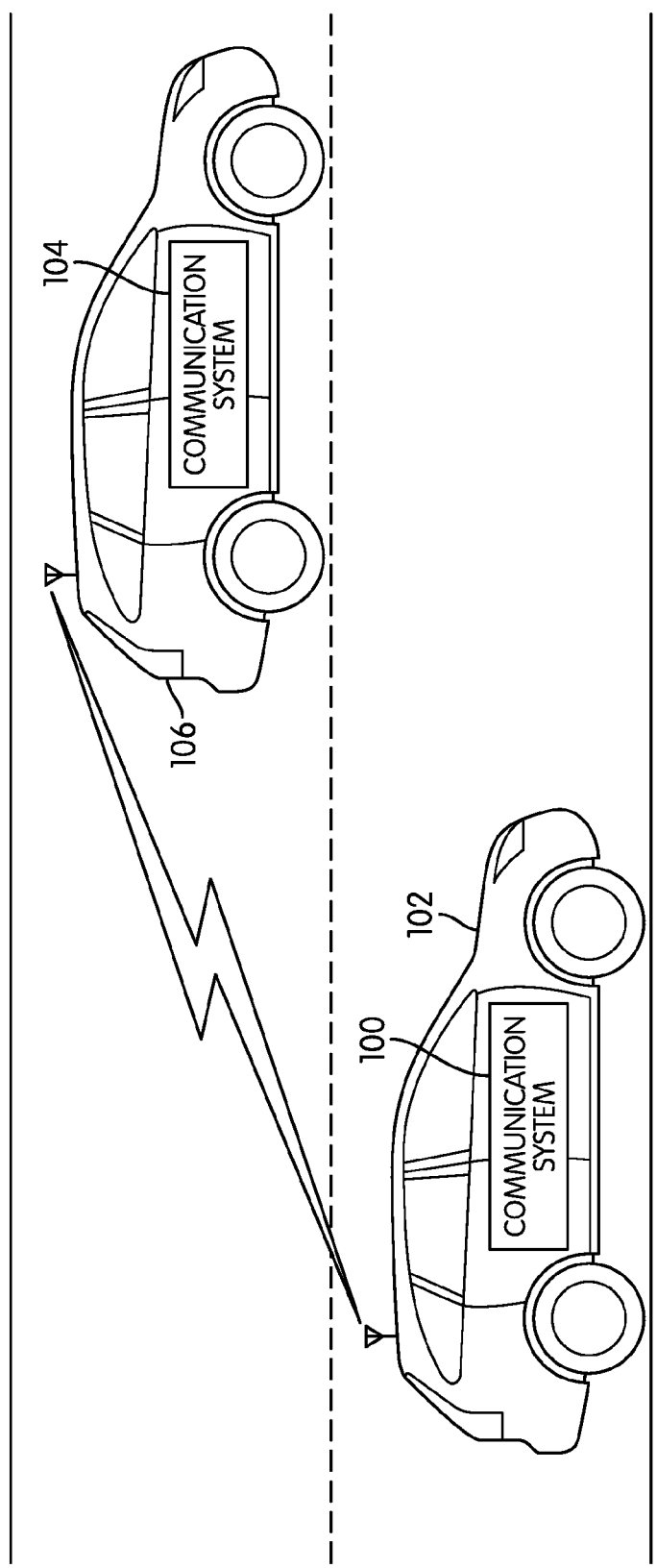
FIG. 1 is a schematic view of an embodiment of a communication system for a plurality of motor vehicles.

FIG. 1 is a schematic view of an embodiment of communication system 100 for motor vehicle 102. For purposes of clarity, only some components of a motor vehicle may be shown. Furthermore, in other embodiments, additional components may be added or removed. Communication system 100 may include provisions for communicating various kinds of information between motor vehicle 102 and any other remote source capable of exchanging information including, but not limited to: remote vehicles, infrastructure units, such as roadside units, as well as other remote sources. Communication system 100 may be used with one or more systems of a motor vehicle. In some embodiments, communication system may receive location information from other vehicles or other roadside units. In other embodiments, communication system 100 may be used with a vehicle safety system. Examples of vehicle safety systems include collision warning systems, lane departure warning systems as well as other types of safety systems. For example, a collision warning system may be configured to receive information from remote vehicles using communication system 100 to determine the locations of other vehicles and to provide alerts to a driver of any potential collisions.

In some embodiments, provisions may be included that permit a vehicle to communicate with another vehicle and/or roadside unit. Motor vehicle 102 may communicate with one or more remote vehicles. In one embodiment, communication system 100 associated with motor vehicle 102 may communicate with a remote communication system 104 associated with a remote vehicle 106. Communication system 100 and remote communication system 104 may be configured to exchange vehicle data associated with motor vehicle 102 and remote vehicle 106. Vehicle data that may be exchanged may include, but is not limited to: speed, location, heading, acceleration, brake status, and other vehicle information. In different embodiments, motor vehicle 102 may communicate with any number of remote communication systems associated with remote vehicles using communication system 100.

Figure 2:
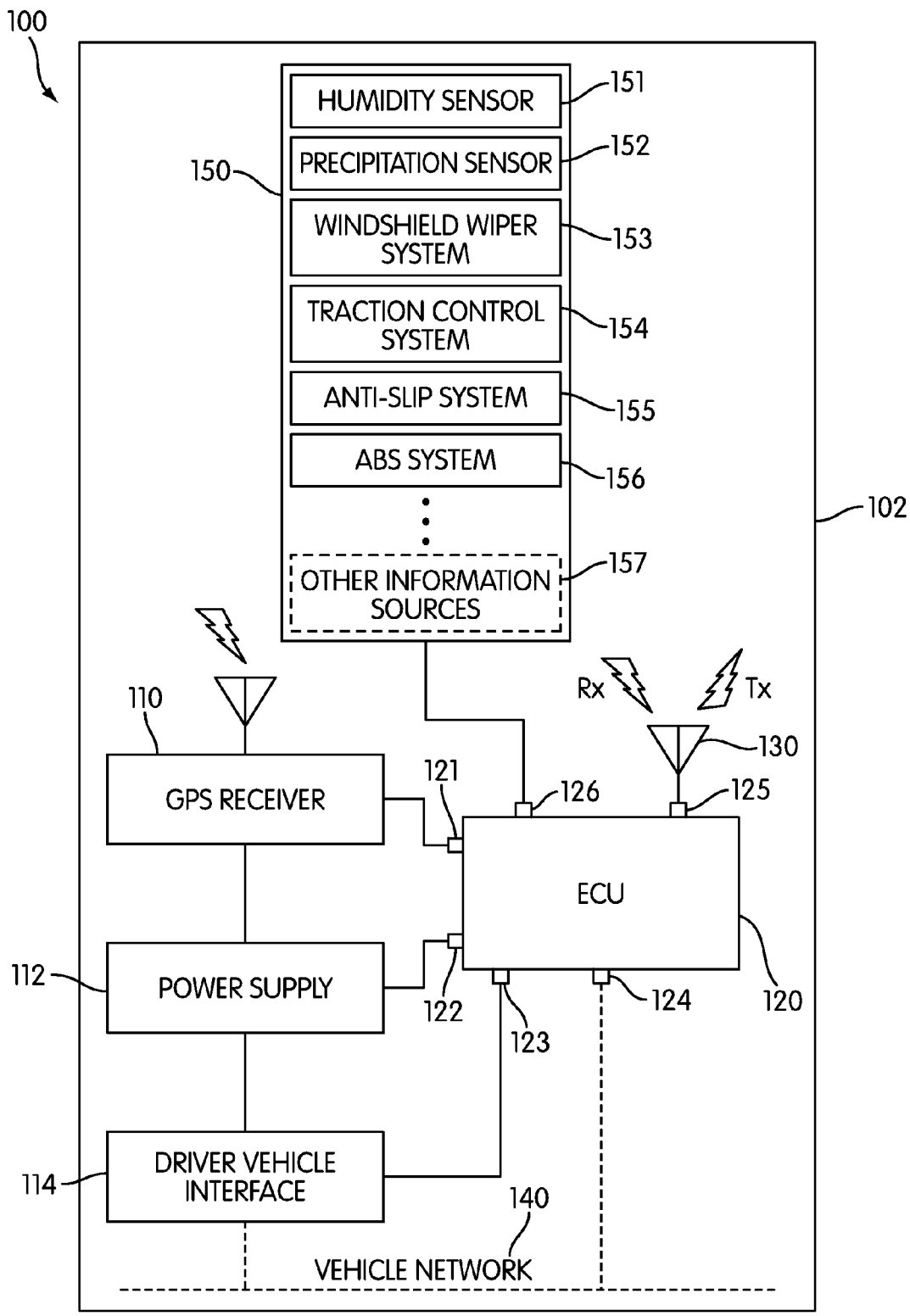
FIG. 2 is a schematic view of an embodiment of a communication system in a motor vehicle.

FIG. 2 illustrates an exemplary embodiment of a communication system associated with a motor vehicle. In this embodiment, communication system 100 associated with motor vehicle 102 is illustrated. It should be understood, however, that communication systems may be provided in other vehicles, including one or more remote communication systems associated with one or more remote vehicles, having a similar arrangement as communication system 100. In other embodiments, communication systems associated with other vehicles may include different elements and/or arrangements as communication system 100, but may be configured to communicate over communication networks with one or more communication systems having a similar arrangement as communication system 100.

Motor vehicle 102 may include provisions for receiving navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information may also include commercial information including business and restaurant names, commercial districts, shopping centers, and parking facilities. Navigation information may also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information may include one item of information, as well as a combination of several items of information.

Motor vehicle 102 may include provisions for receiving GPS information. In some embodiments, motor vehicle 102 may include GPS receiver 110. In an exemplary embodiment, GPS receiver 110 may be used for gathering GPS information for use by any systems of a motor vehicle, including, but not limited to: GPS based navigation systems. In some embodiments, GPS receiver 110 may be used for gathering additional information associated with motor vehicle 102. In an exemplary embodiment, GPS receiver 110 may provide vehicle data, including, but not limited to: speed, location, heading, acceleration, and other dynamic vehicle information.

Motor vehicle 102 may include provisions for powering one or more devices. In some cases, motor vehicle 102 may include power supply 112. Generally, power supply 112 may be any type of power supply associated with a motor vehicle. In some cases, power supply 112 may be a car battery and/or an alternator. In other cases, power supply 112 may be another type of power supply available within motor vehicle 102. Although power supply 112 is shown as connected to some components of motor vehicle 102 in the current embodiment, it will be understood that in other embodiments, additional components may be connected to power supply 112. In still other cases, some components that are shown as connected to power supply 112 may not be connected to power supply 112.

Motor vehicle 102 may include provisions for communicating with a driver. In some embodiments, motor vehicle 102 may include a driver vehicle interface 114. In some cases, driver vehicle interface 114 may include provisions for transmitting information to a driver and/or passenger. In other cases, driver vehicle interface 114 may include provisions for receiving information from a driver and/or passenger. In an exemplary embodiment, driver vehicle interface 114 may include provisions for transmitting and receiving information from a driver and/or passenger. In one embodiment, driver vehicle interface 114 may include audio and/or visual components for transmitting and receiving information from a driver and/or passenger, including, but not limited to one or more of a display, touchscreen, keyboard, speakers, microphone, and other input and/or output devices using text, graphics, icons, voice recognition, sound, speech, and other audio and/or visual indicators.

Motor vehicle 102 may include provisions for communicating, and in some cases controlling, the various components associated with motor vehicle 102. In some embodiments, motor vehicle 102 may be associated with a computer or similar device. In the current embodiment, motor vehicle 102 may include electronic control unit 120, hereby referred to as ECU 120. In one embodiment, ECU 120 may be configured to communicate with, and/or control, various components of motor vehicle 102. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports may facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that may be used, however, it should be kept in mind that not every port or provision must be used or included in a given embodiment.

In some embodiments, ECU 120 may include port 121 for communicating with GPS receiver 110. In particular, ECU 120 may be configured to receive GPS information and/or vehicle data from GPS receiver 110. In addition, ECU 120 may include port 122 for receiving power from power supply 112. Also, ECU 120 may include port 123 for communicating with driver vehicle interface 114. In particular, ECU 120 may be configured to transmit information to driver vehicle interface 114, as well as to receive information from driver vehicle interface 114.

A motor vehicle may include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicle communication network is a dedicated short range communication (DSRC) network. In some cases, DSRC networks may be configured to operate in the 5.9 GHz band with bandwidth of approximately 75 MHz. Furthermore, DSRC networks may have a range of up to approximately 1000 m.

In some embodiments, ECU 120 may include port 125 that is configured to communicate with one or more wireless communication devices. The one or more wireless communication devices may be DSRC devices. In an exemplary embodiment, port 125 may be associated with wireless communication device 130 that is configured to transmit and/or receive vehicle data and/or other vehicle information over one or more vehicle communication networks. Wireless communication device 130 may be an antenna. Wireless communication device 130 may be a DSRC antenna or any other type of antenna that is configured to transmit vehicle data and/or other vehicle information over vehicle communication networks. Wireless communication device 130 may be a mobile antenna or a stationary antenna. Although wireless communication device 130 is shown as being disposed on the roof of motor vehicle 102, it will be understood that in other embodiments, wireless communication device 130 may be placed anywhere on or within the motor vehicle.

Motor vehicle 102 may include provisions for communicating with one or more components of a motor vehicle that are associated directly, or indirectly, with motor vehicle 102. In some cases, ECU 120 may include additional ports for communicating directly with one or more additional devices of a motor vehicle, including various sensors or systems of the motor vehicle. In an exemplary embodiment, ECU 120 may include port 124 for communicating with vehicle network 140. By providing communication between ECU 120 and vehicle network 140, ECU 120 may have access to additional information concerning motor vehicle 102. For instance, in some cases, ECU 120 may be configured to receive information related to various operating conditions of a motor vehicle. Examples of information related to operating conditions that may be received via vehicle network 140 include, but are not limited to: vehicle speed, vehicle acceleration, engine speed, brake status, windshield wiper operation status, traction control operation status, anti-lock brake operation status, anti-slip operation status, as well as other parameters associated with the operating condition of motor vehicle 102.

In other embodiments, ECU 120 may include provisions for communicating directly with a source of information associated with motor vehicle 102. In one embodiment, for example, ECU 120 may include port 126 for communicating with information source 150. Although ECU 120 is shown as communicating with information source 150 in the current embodiment, it will be understood that in other embodiments, additional information sources may communicate with ECU 120.

In some embodiments, information provided by information source 150 may be related to various operating conditions, such as the examples discussed above with respect to vehicle network 140. In other embodiments, information may be related to the weather condition surrounding motor vehicle 102.

Throughout this detailed discussion and in the claims, the term "weather condition" refers to the state of the atmosphere surrounding motor vehicle 102. The term "weather condition" includes, but, is not limited to temperature and moisture condition of the surrounding atmosphere. Weather condition may be associated with presence or lack of presence of a moisture condition. Moisture condition (also referred to as "ambient moisture condition") may be any water-based precipitation or phenomena. Ambient moisture condition may include liquid, gaseous, and solid water-based precipitation or phenomena. Examples of water-based precipitation or phenomena may include, but is not limited to: rain, dew, condensation, humidity, steam, fog, ice, sleet, hail, and snow.

In some embodiments, information source 150 may include a sensor that may directly communicate information related to the weather condition. In other embodiments, information source 150 may include a vehicle system of motor vehicle 102 that may communicate information related to the operating condition of that vehicle system from which the weather condition can be indirectly inferred. In further embodiments, information source 150 may be modified to provide additional or alternative information as desired.

As shown in FIG. 2, ECU 120 may communicate with more than one information source 150, information sources 151-157. Although ECU 120 is shown as communicating with information sources 151-157 in the current embodiment, it will be understood that information source 150 is optional. Information source 150 may include any one or combination of information sources 151-156. In other embodiments, information source 150 may be modified to include alternative or additional information sources 157 that are suitable for the information desired.

In some embodiments, information source 150 that may directly communicate information related to weather condition associated with motor vehicle 102 may be a sensor that can detect the presence of a water-based precipitation or phenomena. Information source 150 may include, but is not limited to, humidity sensor 151 and precipitation sensor 152. Humidity sensor 151 and precipitation sensor 152 may be any known type of sensors. Although motor vehicle 102 is shown as being equipped with humidity sensor 151 and precipitation sensor 152, it will be understood that humidity sensor 151 and/or precipitation sensor 152 are optional. In further embodiments, it will be also understood that other information sources 157 may be other sensors that are equipped in motor vehicle 102.

Humidity sensor 151 may communicate information regarding the detection of a gaseous water-based phenomena in the surrounding atmosphere. Gaseous water-based phenomena may include, but is not limited to, dew, condensation, humidity, steam, and fog. In some embodiments, humidity sensor 151 may communicate information regarding the presence of a gaseous-water based phenomena in the atmosphere. Humidity sensor 151 may communicate information regarding the amount of a gaseous water-based phenomena in the atmosphere. In some embodiments, humidity sensor 151 may be configured to be part of a temperature sensor. In other embodiments, humidity sensor 151 may be configured to be a separate sensor. Humidity sensor 151 may also be configured to be part of other vehicle systems such as windshield anti-fogging systems.

Precipitation sensor 152 may communicate information regarding the presence of a liquid or solid water-based precipitation. Liquid and solid water-based precipitation may include, but is not limited to, rain, freezing rain, snow, hail, and ice. Precipitation sensor 152 may be capable of communicating information regarding the presence of a liquid or solid water-based precipitation. Precipitation sensor 152 may also detect the amount of precipitation by detecting the falling rate. In some embodiments, precipitation sensor 152 may be configured to be a component of a wiper control system that controls the activation and speed of windshield wipers. In other embodiments, precipitation sensor 152 may be configured to be a separate sensor.

In other embodiments, information source 150 that may communicate information related to operating condition of motor vehicle 102 may be a vehicle system that is activated during the presence of a water-based precipitation or phenomena. The activation, the length of activation, the number of activations, and other information related to activations may be used to infer the presence and/or amount of a water-based precipitation. Information source 150 may include, but is not limited to: windshield wiper system 153, traction control system 154, anti-slip system 155, and anti-lock braking system (also referred to as "ABS System") 156. Windshield wiper system 153, traction control system 154, anti-slip system 155, and ABS system 156 may be any known type of vehicle systems. Although motor vehicle 102 is shown as being equipped with windshield wiper system 153, traction control system 154, anti-slip system 155, and ABS system 156, windshield wiper system 153, traction control system 154, anti-slip system 155, and ABS system 156 are optional. In further embodiments, it will be also understood that other information sources 157 may be other vehicle systems that are equipped in motor vehicle 102.

Windshield wiper system 153 may communicate information regarding the operation of windshield wipers of motor vehicle 102. In some embodiments, the information may be regarding the activation of windshield wipers. In other embodiments, the information may include the length of activation of the windshield wipers. In further embodiments, the information may include the operating speed of the windshield wipers.

In some embodiments, the presence of a water-based precipitation or phenomena may be inferred from the activation of windshield wipers, including the length of activation. In other embodiments, the amount and/or type of a water-based precipitation or phenomena may be inferred from the speed of the windshield wipers. For example, if the windshield wipers are continuously operating at a high speed several minutes, a liquid or solid water-based precipitation, such as rain or snow, is falling heavily may be inferred.

In other embodiments, the presence of a water-based precipitation or phenomena may be inferred from the activation of certain vehicle systems that are typically activated in the presence of slippery surfaces caused by water-based phenomena. A repeated activation of a system may infer the presence of a water-based phenomena or precipitation. The number of activations of a system may also infer the amount of a water-based phenomena or precipitation. In some embodiments, the vehicle system may be a safety system. The vehicle system may include, but is not limited to, traction control system 154, anti-slip system 155, and ABS system 156. In some embodiments, some or all of these systems may be a separately operable. In other embodiments, some or all of these systems may be integrated with other vehicle systems.

Traction control system 154 may communicate information regarding the operation of traction control system 154. Traction control system 154 may assist in maintaining traction of motor vehicle 102 while driving on slippery surfaces. In some embodiments, traction control system 154 may sense drive-wheel slip under acceleration and brake the slipping wheel and/or reduce excessive engine power until engine is regained. In some embodiments, traction control system 154 may communicate information regarding the activation of traction control system 154. In some embodiments, the information may include the amount of activations. In other embodiments, the information may include the length of activation.

Anti-slip system 155 may communicate information regarding the operation of anti-slip system 155. Anti-slip system 155 may detect and minimize skids and slides. The skids and slides may be associated with side slip of either the front and rear wheels. Anti-slip system 155 may apply the brakes to counter an oversteer or an understeer. In some embodiments, anti-slip system 155 may communicate information regarding the activation of anti-slip system 155. In some embodiments, the information may include the amount of activations. In other embodiments, the information may include the length of activation.

ABS system 156 may communicate information regarding the operation of ABS system 156. ABS system 156 may be a safety system that prevents the wheels on motor vehicle 102 from locking up while braking and may decrease braking distance on slippery surfaces. In some embodiments, ABS system 156 may communicate information regarding the activation of ABS system 156. In some embodiments, the information may include the amount of activations. In other embodiments, the information may include the length of activation.

Motor vehicles associated with vehicle communication networks may be configured to exchange information by transmitting and receiving a wireless signal encoded with a message. In some embodiments, motor vehicles may exchange basic safety messages (BSMs) via the vehicle communication networks. In some cases, basic safety messages may include information related to the position, dynamic motion, control and/or vehicle size of the transmitting vehicle. In one embodiment, a BSM may include information related to speed, location, heading, acceleration, brake status, and other dynamic information associated with the transmitting vehicle. In other cases, a basic safety message may include additional information. In still other cases, a basic safety message may include less information. By transmitting basic safety messages to surrounding vehicles, each vehicle may exchange information that may be useful in facilitating safety for each driver. In some cases, the information contained in a basic safety message may then be utilized by a particular vehicle to control a vehicle safety system, such as a collision warning system. In an exemplary embodiment, the information contained in a basic safety message may be utilized by a particular vehicle to control other vehicle systems, such as a cabin air control system as further described below.

Throughout this detailed discussion and in the claims, the term "wireless signal" is used to describe a wireless signal that is encoded with any collection or packet of information that is transmitted over a vehicle communication network. The wireless signal may include BSMs or may be encoded with additional or less information than a BSM. Wireless signals may be encoded with any number of bytes of information or data.

Wireless signals may be transmitted as an electromagnetic wave. A wave may be characterized by its amplitude and frequency. Amplitude corresponds to the strength of the signal and may be measured by the change between the peak (highest amplitude value) and a baseline X-axis during one wave cycle. Frequency (F) is a number of cycles per unit time (T)), and is calculated by taking the inverse of a length of time T (F=1/T).

FIGS. 3-8 illustrate examples of vehicle-to-vehicle communication under different weather conditions. Although a motor vehicle is shown communicating with another motor vehicle, it will be understood that in other embodiments a motor vehicle may be communicating with more than one vehicle, a roadside unit, as well as other infrastructure units.

Figure 3:
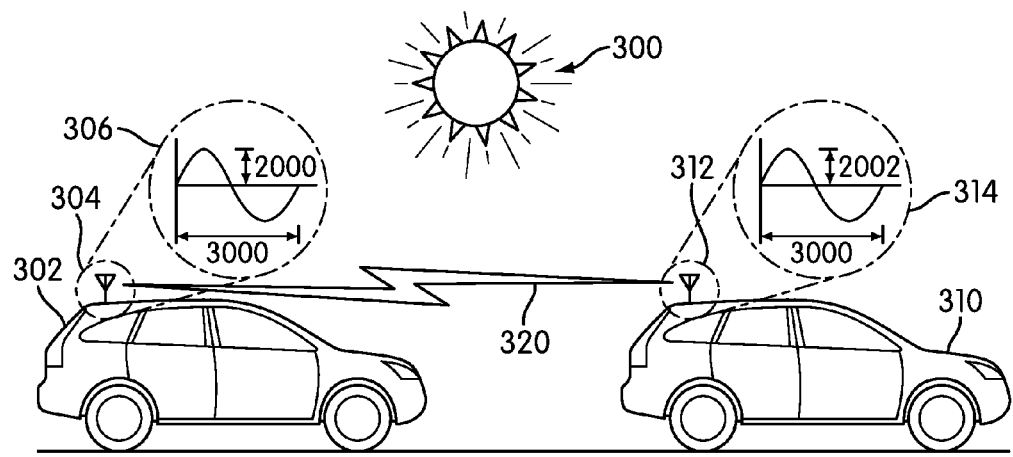
FIG. 3 is a schematic view of an embodiment of a communication between motor vehicles during a low ambient moisture condition.

FIG. 3 illustrates an embodiment of vehicle-to-vehicle communication under a low ambient moisture condition, such as sunny with little or no humidity. Under ideal weather conditions, i.e., a low ambient moisture condition, the strength of the wireless signal may not deteriorate during transmission. As shown in FIG. 3, under low ambient moisture condition 300, wireless communication device 304 of first motor vehicle 302 may transmit wireless signal 306 to wireless communication device 312 of second motor vehicle 310 with little or no deterioration. Wireless signal 320 is transmitted from wireless communication device 304 as wave 306 and is received by wireless communication device 312 as wave 314. As shown in FIG. 3, the transmitted wave 306 has amplitude 2000 that is substantially the same as amplitude 2002 of the received wave 314.

However, wireless signals may change during transmission. The signal may deteriorate during the transmission. The strength of the signal may decrease between transmission and reception. Wireless signals may attenuate during transmission. Attenuation may be illustrated by the reduction in amplitude in the received wireless signal from the transmitted wireless signal. Wireless signals may attenuate during transmission due to any number of factors, including, but not limited to, the distance between the wireless communication devices and environment through which the wireless signal transmits. For example, wireless signals may become weaker the farther the wireless signal travels. Also, weather and travel conditions may affect the strength of a transmitted wireless signal. Ambient moisture may cause attenuation of wireless signal during transmission. Presence of ambient moisture may increase the possibility of attenuation of wireless signals during transmission.

The amount of attenuation due to ambient moisture depends on several factors. Factors that may affect attenuation include, but are not limited to, the type of ambient moisture, the amount of ambient moisture, the distance the wireless signal travels through the ambient moisture, and the frequency of the transmitted wireless signal. Attenuation caused by ambient moisture may be stronger at specific frequencies.

FIGS. 4-8 illustrate embodiments of vehicle-to-vehicle communication that occur during a high ambient moisture condition, such as water-based precipitation and phenomena. Although FIGS. 4-8 illustrate a high ambient moisture condition such as rain, it will be understood that the high ambient moisture condition may be any water-based precipitation or phenomena. In other embodiments, the high ambient moisture condition may include, but is not limited to: rain, dew, condensation, humidity, steam, fog, ice, sleet, hail, and snow.

Figure 4:
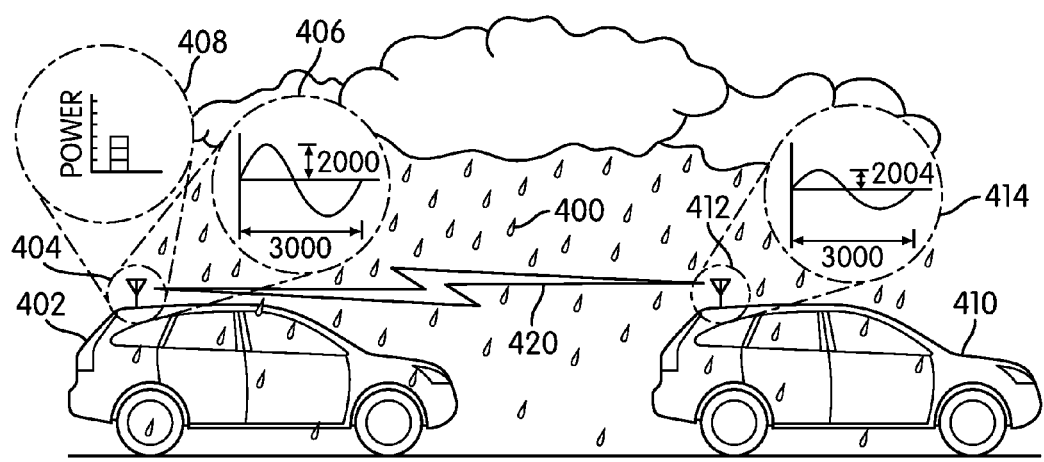
FIG. 4 is a schematic view of an embodiment of a communication between motor vehicles during a high ambient moisture condition.

FIG. 4 illustrates an example of how the presence of ambient moisture may negatively impact a transmitted wireless signal. As shown in FIG. 4, high ambient moisture condition 400 may cause wireless signal 420 to attenuate during transmission. Wireless communication device 404 of first motor vehicle 402 may transmit wireless signal 420 as wave 406 with amplitude 2000 to wireless communication device 412 of second vehicle 410. However, wireless communication device 412 of second motor vehicle 410 may receive wireless signal 420 as wave 414 with amplitude 2004 that is smaller than amplitude 2000. Presence of ambient moisture may cause reduction in the strength of wireless signal 420 as illustrated by smaller amplitude 2004 of received wireless signal 420 illustrated by wave 414.

FIGS. 5-8 illustrate embodiments of how transmitter and receiver parameters of a wireless communication device may be adjusted to compensate for the ambient moisture. The adjusted parameters may improve the reception performance of the transmitted wireless signal. The adjustment of the parameters may be adjusted according to presence, type, and/or amount of ambient moisture to mitigate the effects of ambient moisture on wireless signals. It will be understood that the type and amount of adjustment of the operating parameters illustrated in FIGS. 5-8 are for explanatory purposes only. The operating parameters may be adjusted to be proportional to the ambient moisture condition.

Figure 5:
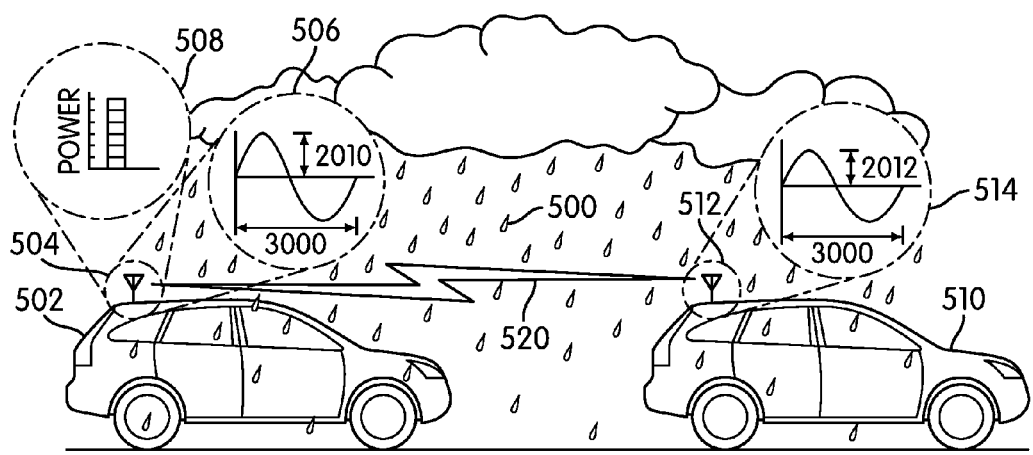
FIG. 5 is a schematic view of an embodiment of a communication between motor vehicles during a high ambient moisture condition.
Figure 6:
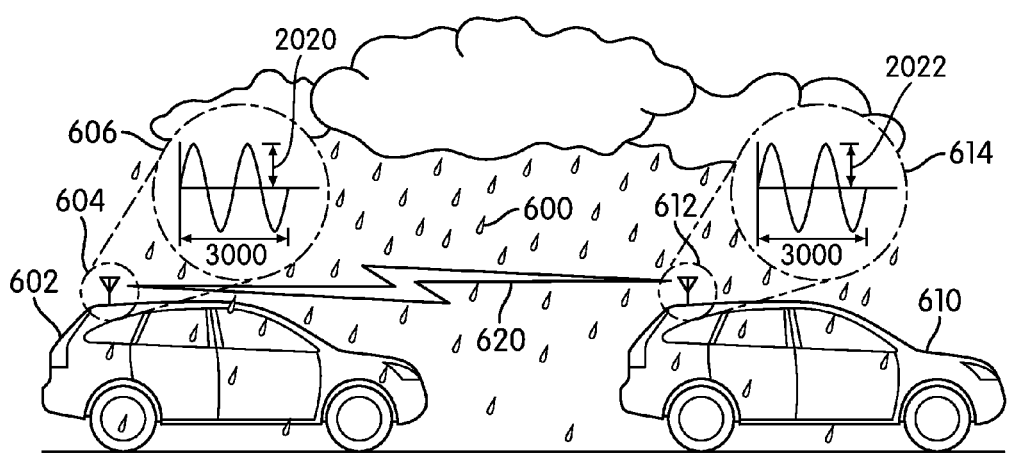
FIG. 6 is a schematic view of an embodiment of a communication between motor vehicles during a high ambient moisture condition.

Attenuation may be compensated by the transmitting wireless communication device adjusting the transmitter parameters. Referring to FIGS. 5 and 6, in some embodiments, the transmitting wireless communication device may adjust power and transmission rate of the outgoing wireless signal. Although FIGS. 5 and 6 illustrate an embodiment of a wireless communication device that adjusts the power and transmission rate parameters, respectively, it will be understood that in other embodiments, a wireless communication device may modify additional transmitter parameters. Examples of additional transmitter parameters, include, but are not limited to, operating voltage, modulation factor, and gain. Also, in other embodiments, a wireless communication device may modify any one or combination of transmitter parameters and receiver parameters, described below.

A wireless communication device transmitting the wireless signal may adjust the power of the transmitting wireless signal to compensate for attenuation thereby mitigating the negative affect an ambient moisture condition may have on reception performance. Increasing power may increase the amplitude of the outgoing wireless signal. The increase in amplitude may compensate for the potential reduction in amplitude during transmission of the wireless signal so that the received signal has the minimum amplitude required for proper reception performance.

FIG. 5 illustrates an embodiment of a wireless communication device that adjusts the power of the outgoing wireless signal. Referring to FIG. 5, wireless communication device 504 may increase the power of the outgoing wireless signal 520 to compensate for attenuation caused by high ambient moisture condition 500. Wireless communication device 504 of first motor vehicle 502 may transmit wireless signal 520 as wave 506 with amplitude 2010 to wireless communication device 512 of second vehicle 510. First wireless communication device 504 may increase the power from power 408 shown in FIG. 4 to power 508 of transmitted wireless signal 520. The increase of power may be illustrated by the increase in amplitude. As shown in FIG. 5, wave 506 has amplitude 2010 that is larger than amplitude 2000 of wave 406.

Like wireless signal 420, during transmission, strength of wireless signal 520 may reduce due to the presence of ambient moisture causing the received wireless signal 520, illustrated as wave 514, to have amplitude 2012. However, the increase in amplitude 2010 of transmitted wave 506 by increasing the power to power 508 compensates for the signal attenuation caused by high ambient moisture condition 500. Received wave 514 may have amplitude 2012 that substantially corresponds to the amplitude 2000 of wave 406. Received wave 514 may thus be received by wireless communication device 512 without a reduction in reception performance.

Attenuation may also be more likely to occur at certain frequencies. Adjusting the transmission rate of a transmitting wireless communication device may change the frequency of the outgoing wireless signal. By changing the frequency of the outgoing wireless signal, attenuation may be mitigated.

FIG. 6 illustrates an embodiment of a wireless communication device that adjusts the frequency of the outgoing wireless signal. Like FIGS. 4 and 5, the vehicle communication is occurring during high ambient moisture condition 600. Wireless communication device 604 of first motor vehicle 602 may transmit wireless signal 620 as wave 606 with a higher frequency to wireless communication device 612 of second vehicle 610. Wireless communication device 604 may increase the frequency by adjusting the transmission rate of wireless signal 620.

Wave 606 has a higher frequency than wave 406. Although wave 606 is illustrated as having one more wavelength that occurs during time period 3000, in other embodiments, wave 606 may be adjusted to have any frequency that may reduce the possibility of attenuation due to ambient moisture. Adjustments of the frequency of wave 606 may be proportional to the ambient moisture condition.

By increasing frequency of the transmitted wireless signal, potential for attenuation may decrease. Received wave 614 may have amplitude 2022 that may be substantially the same as amplitude 2020 of transmitted wave 606 because attenuation may not occur at the transmitted frequency. Received wave 614 thus may received by wireless communication device 612 without a reduction in reception performance.

Figure 7:
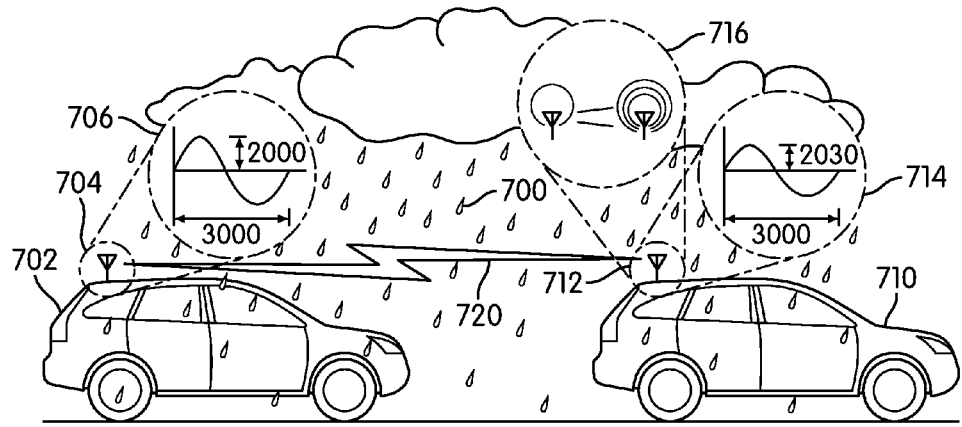
FIG. 7 is a schematic view of an embodiment of a communication between motor vehicles during a high ambient moisture condition.
Figure 8:
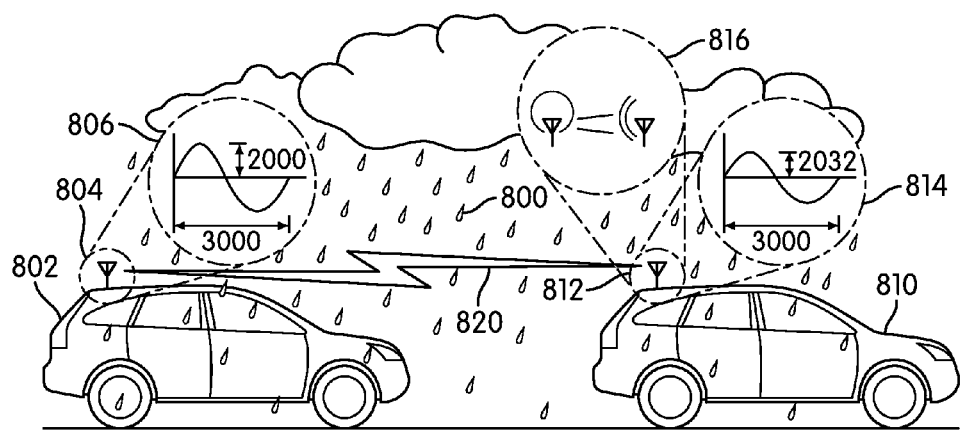
FIG. 8 is a schematic view of an embodiment of a communication between motor vehicles during a high ambient moisture condition.

Attenuation may also be compensated by a receiving wireless communication device adjusting its receiver parameters. Referring to FIGS. 7 and 8, in some embodiments, a wireless communication device may adjust the sensitivity or gain to increase the ability of a wireless communication device to process a received signal. Increasing the sensitivity of a wireless communication device may increase the ability of a wireless communication device to process received signals of a lower magnitude because the wireless communication device may better differentiate the received signal from background noise. Increasing the gain of a wireless communication device may increase the ability of a wireless device to receive signals that may have been attenuated during transmission. Although FIGS. 7 and 8 illustrate an embodiment of a wireless communication device that adjusts sensitivity and gain, respectively, a wireless communication device may modify additional receiver parameters, such as power supply. Also, in other embodiments, a wireless communication device may modify any one or combination of receiver parameters and transmitter parameters.

In some embodiments, referring to FIG. 7, a wireless communication device may increase the sensitivity of the receiving wireless communication device so that it may receive wireless signals that may have been attenuated during transmission. Like FIGS. 4-6, wireless signal 720 may attenuate during transmission due to high ambient moisture condition 700. Wireless communication device 704 of first motor vehicle 702 may transmit wireless signal 720 as wave 706 with amplitude 2000 to wireless device 712 of second motor vehicle 710. Wireless communication device 712 may receive wireless signal 700 as wave 714 with amplitude 2030 that is smaller than amplitude 2000 of wave 706. However, wireless communication device 712 may receive an attenuated signal without a reduction in reception performance because second wireless communication device 712 increased its sensitivity 716 to receiving wireless signals.

In other embodiments, referring to FIG. 8, a wireless communication device may increase the gain of the receiving wireless communication device so that it may receive wireless signals that may have been attenuated during transmission. Like FIGS. 4-7, wireless signal 820 may attenuate during transmission due to high ambient moisture condition 800. Wireless communication device 812 of second wireless device 810 of second motor vehicle 810 may receive wireless signal 820 as wave 814 with amplitude 2032 that is smaller than amplitude 2000 of transmitted wave 806 from wireless communication device 804 of first motor vehicle 802. However, attenuation of wireless signal 800 may not reduce reception performance because second wireless communication device 812 increased its gain 816 by increasing intensity in a direction of transmitting wireless signals.

Figure 9:
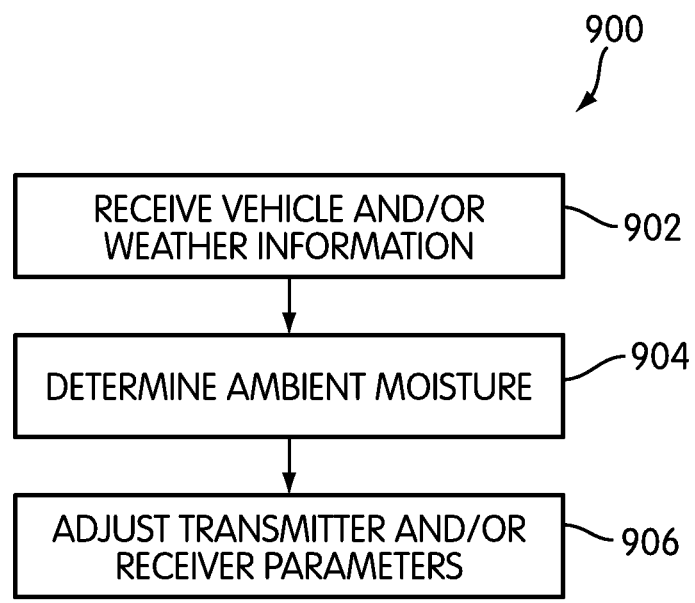
FIG. 9 is an embodiment of a process for adjusting operating parameters of a wireless communication device based on determined ambient moisture.

FIG. 9 illustrates a process for using the vehicle and/or weather information received from information sources to adjust the transmitter and/or receiver parameters of wireless communication device of a motor vehicle. In some embodiments, some of the following steps could be accomplished by ECU 120. In other embodiments, some of the following steps could be accomplished by wireless communication device 130. In addition, in other embodiments, some of the steps could be performed by other components of motor vehicle 102. For purposes of clarity, wireless communication system 100 may be used to refer collectively to ECU 120 and wireless communication device 130. In other words, steps performed by wireless communication system 100 may be performed by either ECU 120 or wireless communication device 130 in the following embodiments. It will be understood that in other embodiments, one or more of the following steps may be options.

As shown in FIG. 9, during step 902, wireless communication system 100 may receive vehicle and/or weather information. In some embodiments, the information may relate to a weather condition. In some embodiments, the weather condition may be detected by a sensor of motor vehicle 102. In other embodiments, the weather condition may be associated with a location of motor vehicle 102. In further embodiments, the information may relate to an operating status of a vehicle system of motor vehicle 102.

In some embodiments, information may be received from information source 150. In other embodiments, the information may be received from GPS receiver 110. As discussed above, in some cases, information source 150 may include, but is not limited to, information sources 151-157 shown in FIG. 2.

During step 904, wireless communication system 100 may use the received information to determine an ambient moisture condition at step 904. As discussed above, in some cases, wireless communication system 100 may directly receive information regarding an amount or presence of an ambient moisture condition. In other cases, wireless communication system 100 may infer an amount or presence of an ambient moisture condition based on the information received. In some embodiments, information regarding an activation of vehicle safety systems may be used to infer an ambient moisture condition.

Next, during step 906, wireless communication system 100 may use the determined ambient moisture condition to adjust transmitter and/or receiver parameters of the wireless communication device.

Figure 10:
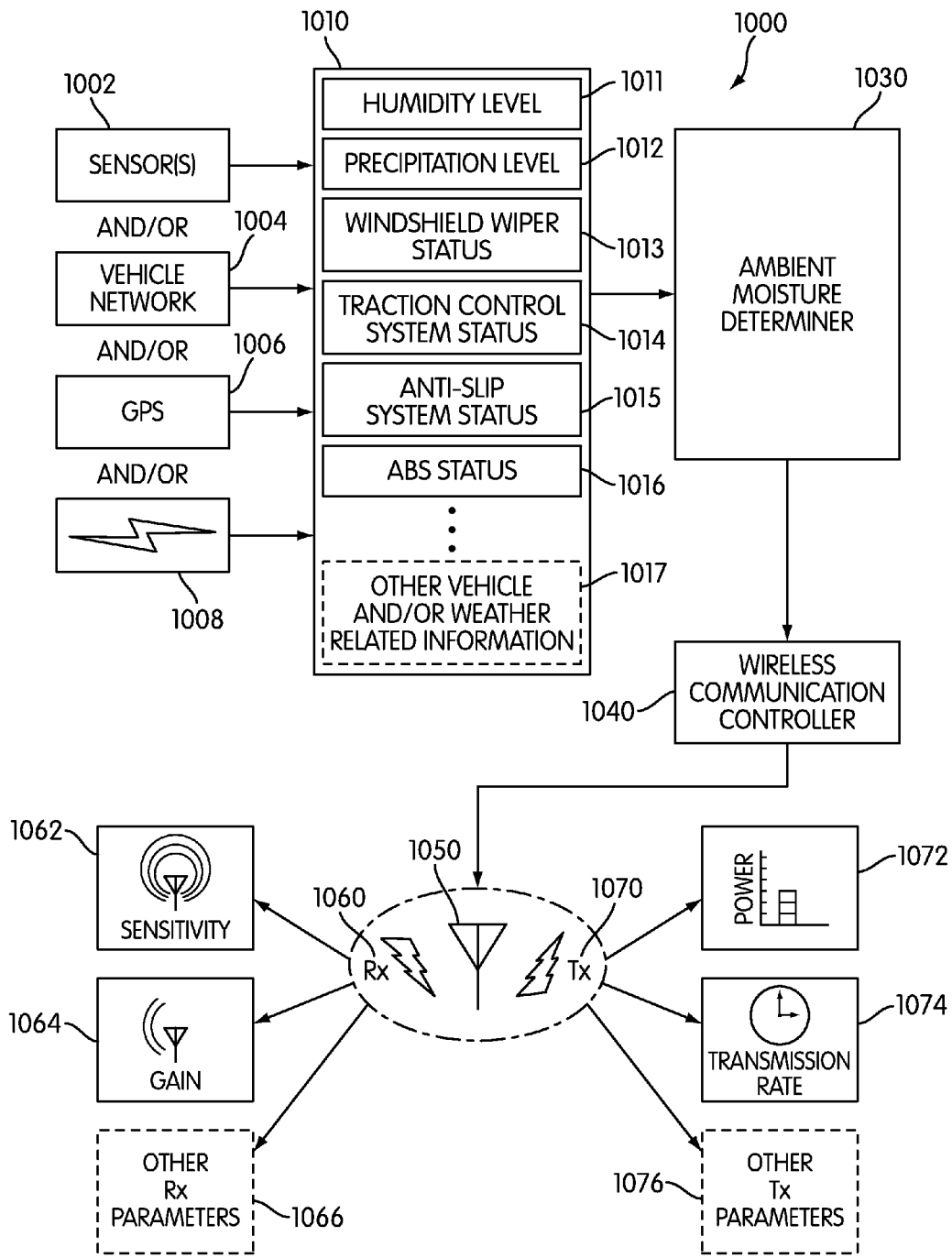
FIG. 10 is a schematic view of an embodiment of a system for determining ambient moisture and adjusting operating parameters of a wireless communication device.

FIG. 10 illustrates an embodiment of a system for determining an ambient moisture condition based on received information and adjusting the operating parameters of a communication wireless device based on the determined ambient moisture condition. All of the following information sources of system 1000 and type of information are optional. Some embodiments may include a given information source or type of information, while others may exclude it. The following description discloses many of the possible information sources and types of information that may be used, however, it should be kept in mind that not every information source or type of information must be used or included in a given embodiment.

In some embodiments, sensor(s) 1002 may transmit information 1010. Sensor(s) 1002 may include any number of sensors. In some embodiments, sensor(s) 1002 may include some or all of information source 150 shown in FIG. 2: humidity sensor 151 and precipitation sensor 152. In other embodiments, sensor(s) 1002 may include one, some or all sensors that are different from sensors 151 and 152. Sensor(s) 1002 may directly detect and transmit information 1010. In some embodiments, information 1010 may be related to a detected weather condition.

In other embodiments, vehicle network 1004, or in the alternative, may transmit information 1010. In some embodiments, vehicle network 1004 may be the same as vehicle network 140. In other embodiments, vehicle network 1004 may be different from vehicle network 140.

In further embodiments, GPS device 1006 may transmit information 1010. GPS device 1006 may transmit information 1010 regarding the location of the motor vehicle.

In other embodiments, information 1010 may be transmitted via wireless signal 1008. Wireless signal 1008 may be transmitted from another communication device. The communication device may be a mobile device, such as a cellular phone, and/or may be from another vehicle and/or roadside communication device.

In some embodiments, information 1010 may include humidity level information 1011, precipitation level information 1012, windshield wiper status information 1013, traction control system status information 1014, anti-slip system status information 1015, ABS system status information 1016, as well as any other vehicle and/or weather related information 1017. Information 1011-1017 is optional. In some embodiments, information 1010 may include one, some or all information 1011-1017. In other embodiments, information 1010 may include different vehicle data or information in addition to or in the alternative of information 1011-1017.

In some embodiments, humidity level information 1011 may include presence and/or the relative amount of humidity, such as low, medium, high or very high level of humidity. In other embodiments, humidity level information 1011 may include a quantitative amount of humidity.

In some embodiments, precipitation level information 1012 may include information regarding the presence and/or type of water-based precipitation or phenomena. In other embodiments, precipitation level information 1012 may also include information regarding the relative or quantitative amount of a water-based precipitation or phenomena.

In some embodiments, windshield wiper status information 1013 may include information regarding the operation status of windshield wipers. In some embodiments, the operation status may include the activation of the windshield wipers and/or the length of the activation. In other embodiments, the operation status may also include the operating speed of the windshield wipers.

In some embodiments, traction control system status information 1014 may include information regarding the operation status of the traction control system. In some embodiments, the operation status may include the activation of the traction control system and/or the length of the activation. In other embodiments, the operation status may also include the frequency of the operation of the traction control system.

In some embodiments, anti-slip system status information 1015 may include information regarding the operation status of the anti-slip system. In some embodiments, the operation status may include the activation of the anti-slip system and/or the length of the activation. In other embodiments, the operation status may also include the frequency of the operation of the anti-slip system.

In some embodiments, ABS system status information 1016 may include information regarding the operation status of an ABS system. In some embodiments, the operation status may include the activation of the ABS system and/or the length of the activation. In other embodiments, the operation status may also include the frequency of the operation of the ABS system.

In some embodiments, other vehicle information and/or weather related information 1017 may include other information regarding water-based precipitation or phenomena. In some embodiments, the information may be related to detected weather condition. In other embodiments, the information may be related to activation of other vehicle safety systems. In further embodiments, information may include information regarding the location of the motor vehicle.

In some embodiments, received information 1010 may be used to determine an ambient moisture condition. System 1000 may include ambient moisture determiner 1030 to determine an ambient moisture condition in the surrounding atmosphere of motor vehicle 102. Ambient moisture determiner 1030 may use some or all of received information 1010 when determining an ambient moisture condition.

In some embodiments, ambient moisture determiner 1030 may include a processor. Ambient moisture determiner 1030 may be configured as a part of communication system 100. In some embodiments, ambient moisture determiner 1030 may be configured as a part of ECU 120. In some embodiments, ambient moisture determiner 1030 may be configured as a part of wireless communication controller 1040. Ambient moisture determiner 1030 may be configured as a part of wireless communication device 1050. In other embodiments, ambient moisture determiner 1030 may be configured as a separate component from communication system 100.

In some embodiments, ambient moisture determiner 1030 may determine the presence of an ambient moisture condition based on received information 1010. In some embodiments, ambient moisture determiner 1030 may determine a presence of an ambient moisture condition based on information directly related to a detected weather condition. In some embodiments, ambient moisture determiner 1030 may determine a presence of an ambient moisture condition based on received humidity level information 1011 and/or precipitation level information 1012. In other embodiments, ambient moisture determiner 1030 may determine the presence of an ambient moisture condition based on other weather related information 1017.

In other embodiments, ambient moisture determiner 1030 may infer the presence of an ambient moisture condition based on received information 1010. Ambient moisture determiner 1030 may infer the presence of an ambient moisture condition based on operating status of at least one vehicle system. In some embodiments, ambient moisture determiner 1030 may infer an ambient moisture condition based on windshield wiper status information 1013, traction control system status information 1014, anti-slip system status 1015 and/or ABS system status 1016. In other embodiments, ambient moisture determiner 1030 may infer the presence of an ambient moisture condition based on other vehicle information 1017 related to the operation status of other vehicle systems of motor vehicle 102.

In other embodiments, ambient moisture determiner 1030 may determine a relative or quantitative estimate of the amount of an ambient moisture condition based on information 1010 received. In some embodiments, ambient moisture determiner 1030 may infer relative amounts of precipitation by analyzing information 1010 regarding the operation status of the motor vehicle, such as windshield wiper status information 1013, traction control system status information 1014, anti-slip system status 1015, and/or ABS system 1016. In other embodiments, ambient moisture determiner 1030 may receive information regarding the quantitative estimate of the amount of an ambient moisture condition by analyzing information 1010 regarding the weather condition, such as humidity level information 1011 and precipitation level information 1012.

In further embodiments, ambient moisture determiner 1030 may determine the type of an ambient moisture condition based on received information 1010. In some embodiments, ambient moisture determiner 1030 may determine the type of an ambient moisture condition by analyzing information 1010 regarding the operation status of the motor vehicle and/or weather condition.

In other embodiments, ambient moisture determiner 1030 may determine the presence, amount and/or type of an ambient moisture condition based on the geographic location of wireless communication device 1050. Ambient moisture determiner 1030 may determine an ambient moisture condition based on information 1010 received by GPS 1006. Ambient moisture determiner 1030 may access a data network to receive information related to the weather condition and/or ambient moisture condition associated with the geographic location of wireless communication device 1050. In some embodiments, the data network may be provided on the internet. In other embodiments, the data network may be provided on a cellular network. The ambient moisture determiner 1030 may access the data network by the wireless communication device 1050 or another communication device. The other communication device may be any communication device configured to communicate and access a data network.

In some embodiments, the other communication device is configured to be a part and/or connected to communication system 100 or may be connected to a vehicle network 140. The other communication device may be separate from communication system 100 and/or vehicle network. In other embodiments, the other communication device may be mobile. In some embodiments, the other communication device may be a cellular phone.

Referring to FIG. 10 again, the ambient moisture determined by ambient moisture determiner 1030 may be sent to other vehicle systems. The ambient moisture determiner 1030 may be used by wireless communication controller 1040 that controls the transmitter and/or receiver parameters of wireless communication device 1050. Wireless communication controller 1040 may include a processor. Wireless communication controller 1040 may be configured as a part of wireless communication system 100. In some embodiments, wireless communication controller 1040 may be configured as a part of ECU 120. In other embodiments, wireless communication controller 1040 may be configured as a part of wireless communication device 1050. In further embodiments, wireless communication controller 1040 may be configured as a separate component from communication system 100.

In some embodiments, wireless communication device 1050 may be the same as wireless communication device 130. In other embodiments, wireless communication device 1050 may be different.

Based on the ambient moisture condition determined by ambient moisture determiner 1030, wireless communication controller 1040 may adjust receiver parameters 1060 and/or transmitter parameters 1070 of wireless communication device 1050.

The adjustments may compensate for attenuation caused by the determined ambient moisture condition. In some embodiments, wireless communication controller 1040 may improve reception performance of a wireless signal by adjusting receiver parameters 1060 according to the determined ambient moisture condition. Receiver parameters 1060 may include any one or combination of, but are not limited to, sensitivity 1062, gain 1064, as well as other receiver parameters 1066. In other embodiments, wireless communication controller 1040, in addition to, or in the alternative, may improve reception performance by adjusting transmitter parameters 1070 according to the determined ambient moisture condition. Transmitter parameters 1070 may include any one or combination of, but are not limited to, power 1072, transmission rate 1074 as well as other transmitter parameters 1076.

In some embodiments, wireless communication controller 1040 may adjust sensitivity 1062 to receiving transmitted signals. In other embodiments, wireless communication controller 1040 may adjust gain 1064 to receiving transmitted signals. By adjusting the receiver parameters, wireless communication controller 1040 may increase the ability of wireless communication device 150 to receive transmitted wireless signals having a reduced strength caused by attenuation from ambient moisture.

In some embodiments, wireless communication controller 1040 may adjust power 1072 to adjust the amplitude of the transmitted wireless signals. Wireless communication controller 1040 may adjust the amplitude of the transmitted wireless signals to an amplitude that would compensate for the attenuation caused by the determined ambient moisture condition. Wireless communication controller 1040 may increase the amplitude of the transmitted wireless signals by increasing the power of an electrical signal sent to wireless communication device 1050.

In other embodiments, wireless communication controller 1040 may modify transmission rate 1074 of outgoing wireless signals. Wireless communication controller 1040 may modify the frequency of outgoing wireless signals. Wireless communication controller 1040 may adjust the frequency of outgoing wireless signals to a frequency that is less susceptible to attenuation caused by ambient moisture than an initial frequency.

The steps in the methods discussed above may be performed in any order. The steps need not be performed in the order shown in the figures or in the order described above. The order of steps in some methods may be altered in some embodiments.

While various embodiments have been described, the description is intended to be exemplary, rather than limiting. It will be apparent to those of ordinary skill in the art that many more embodiments and implementations are possible that are within the scope of the claims. Accordingly, the embodiments are not to be restricted except in light of the attached claims and their equivalents. Also, various modifications and changes may be made within the scope of the attached claims.

What is claimed is:

1. A method for adjusting an operation of a first wireless communication device in a first motor vehicle that communicates with a second wireless communication device in a second motor vehicle, comprising the steps of:
   receiving information from at least one information source related to an operation status of at least one vehicle system of the first motor vehicle;
   analyzing the information to determine an ambient moisture condition;
   based on the analysis, adjusting an operating parameter of the first wireless communication device;
   operating the first wireless communication device according to the adjusted operating parameter; and
   wherein the step of operating the first wireless communication device comprises at least one of:
   transmitting a wireless signal from the first wireless communication device in the first motor vehicle to the second wireless communication device in the second motor vehicle; and
   receiving a wireless signal at the first wireless communication device in the first motor vehicle from the second wireless communication device in the second motor vehicle.

2. The method according to claim 1, wherein the step of adjusting compensates for attenuation of a wireless signal due to the determined ambient moisture.

3. The method according to claim 1, wherein:
   the at least one vehicle system is selected from a group consisting essentially of a windshield wipers system, a traction control system, an anti-slip system, an anti-lock brake system, and any combination thereof, and
   the information relates to at least one of activation, frequency of activation, and length of activation of the vehicle system.

4. The method according to claim 1, wherein:
   the step of adjusting includes adjusting at least one transmitter parameter of the first wireless communication device; and
   the step of operating includes transmitting a wireless signal according to the adjusted parameter.

5. The method according to claim 4, wherein the at least one transmitter parameter includes an amplitude and a transmission rate.

6. The method according to claim 1,
   wherein the step of adjusting includes adjusting at least one receiver parameter of the first wireless communication device; and
   wherein the step of operating includes receiving a wireless signal according to the adjusted parameter.

7. The method according to claim 6, wherein the receiver parameter includes sensitivity and gain.

8. The method according to claim 1, wherein the receiving step further includes receiving information regarding a weather condition.

9. The method according to claim 8, wherein the at least one information source is selected from a group consisting essentially of at least one of one or more vehicle sensors, a vehicle network, another wireless communication device, a geographic positioning system, and any combination thereof.

10. The method according to claim 9,
    wherein the one or more vehicle sensors includes a humidity sensor and a precipitation sensor.

11. The method according to claim 9, further comprising the steps of:
    determining a geographic location of the first wireless communication device; and
    obtaining the information from a data network that corresponds to the geographic location of the first wireless communication device.

12. The method according to claim 1, wherein the first wireless communication device is configured for vehicle-to-vehicle communication.

13. The method according to claim 1, further comprising the step of:
    at least one of transmitting a wireless signal according to the adjusted parameter to and receiving a wireless signal according to the adjusted parameter from a roadside unit.

14. A wireless communication system that is configured to communicate over a vehicle communication network, comprising:
    a first wireless communication device in a first motor vehicle configured to communicate with a second wireless communication device in a second motor vehicle;
    an ambient moisture determiner that is configured to receive information related to an operating status of a system of a motor vehicle and a weather condition, and to determine an ambient moisture condition based on the received information;
    a wireless communication controller that is configured to adjust an operating parameter of the first wireless communication device based on a determination by the ambient moisture determiner; and
    wherein the wireless communication controller is configured to operate the first wireless communication device to at least one of:
    transmit a wireless signal from the first wireless communication device in the first motor vehicle to the second wireless communication device in the second motor vehicle; and
    receive a wireless signal at the first wireless communication device in the first motor vehicle from the second wireless communication device in the second motor vehicle.

15. The wireless communication system according to claim 14, wherein the information is received from at least one of one or more vehicle sensors, a vehicle network, another wireless communication device, and a geographic positioning system.

16. The wireless communication system according to claim 14, wherein:
    the ambient moisture determiner determines the ambient moisture condition based on the operating status of the system of the first motor vehicle; and
    the system is selected from a group consisting essentially of a windshield wiper status system, a traction control system, an anti-lock braking system, an anti-slip system, and any combination thereof.

17. The wireless communication system according to claim 14, wherein:
the ambient moisture determiner is configured to communicate with one or more sensors;
the one or more sensors is configured to detect a weather condition; and
the one or more sensors is configured to transmit the information to the ambient moisture determiner.

18. The wireless communication system according to claim 17, wherein the one or more sensors include at least one of a precipitation sensor and a humidity sensor.

19. The wireless communication system according to claim 14,
wherein the first wireless communication device is configured to communicate with a vehicle network of the motor vehicle; and
wherein the vehicle network is configured to transmit the information to the second wireless communication device.

20. The wireless communication system according to claim 14,
wherein the first wireless communication device is configured to communicate with a geographic positioning system configured to determine a geographic location of the first wireless communication device; and
wherein the first wireless communication device is configured to communicate with a data network to obtain the weather condition corresponding to the geographic location.

21. A method for adjusting an operation of a wireless communication device that is configured to communicate over a vehicle communication network, comprising the steps of:
receiving information from at least one information source related to at least one of an operating status of a vehicle system of a motor vehicle and a weather condition;
analyzing the information to determine an ambient moisture condition;
based on the determined ambient moisture condition, adjusting a transmitter parameter of the wireless communication device; and
transmitting a wireless signal over the vehicle communication network to another wireless communication device in another vehicle according to the adjusted parameter.

22. The method according to claim 21, wherein the step of adjusting at least one transmitter parameter compensates for attenuation of the wireless signal due to the determined ambient moisture condition.

23. The method according to claim 21, wherein the information source is selected from a group consisting essentially of at least one of one or more vehicle sensors, a vehicle network, a different wireless communication device, a geographic positioning system, and a combination thereof.

24. The method according to claim 23, wherein the one or more vehicle sensors includes a humidity sensor and a precipitation sensor.

25. The method according to claim 21, further comprising the steps of:
determining a geographic location of the wireless communication device; and
obtaining information regarding the weather condition from a data network that corresponds to the geographic location of the wireless communication device.

26. The method according to claim 21, wherein the at least one transmitter parameter includes an amplitude and a transmission rate.

27. The method according to claim 21, wherein the method further comprises the step of:
adjusting at least one receiver parameter, the at least one receiver parameter including sensitivity and gain.

28. A method for adjusting an operation of a wireless communication device in a motor vehicle that is configured to communicate over a vehicle communication network, comprising the steps of:
receiving information from at least one information source related to at least one of an operating status of a vehicle system of the motor vehicle and a weather condition;
analyzing the information to determine an ambient moisture condition;
based on the determined ambient moisture condition, adjusting a receiver parameter of the wireless communication device; and
receiving a wireless signal over the vehicle communication network from another wireless communication device in another motor vehicle according to the adjusted parameter.

29. The method according to claim 28, wherein the step of adjusting at least one receiver parameter compensates for attenuation of the wireless signal due to the determined ambient moisture condition.

30. The method according to claim 28, wherein the information source is selected from a group consisting essentially of at least one of one or more vehicle sensors, a vehicle network, a different wireless communication device, a geographic positioning system, and any combination thereof.

31. The method according to claim 28, wherein the one or more vehicle sensors includes a humidity sensor and a precipitation sensor.

32. The method according to claim 28, further comprising the steps of:
determining a geographic location of the wireless communication device; and
obtaining information regarding the weather condition from a data network that corresponds to the geographic location of the wireless communication device.

* * * * *